Jan. 11, 1966     S. H. PETERSON     3,228,575
CARTOP CARRIER
Filed Oct. 21, 1964
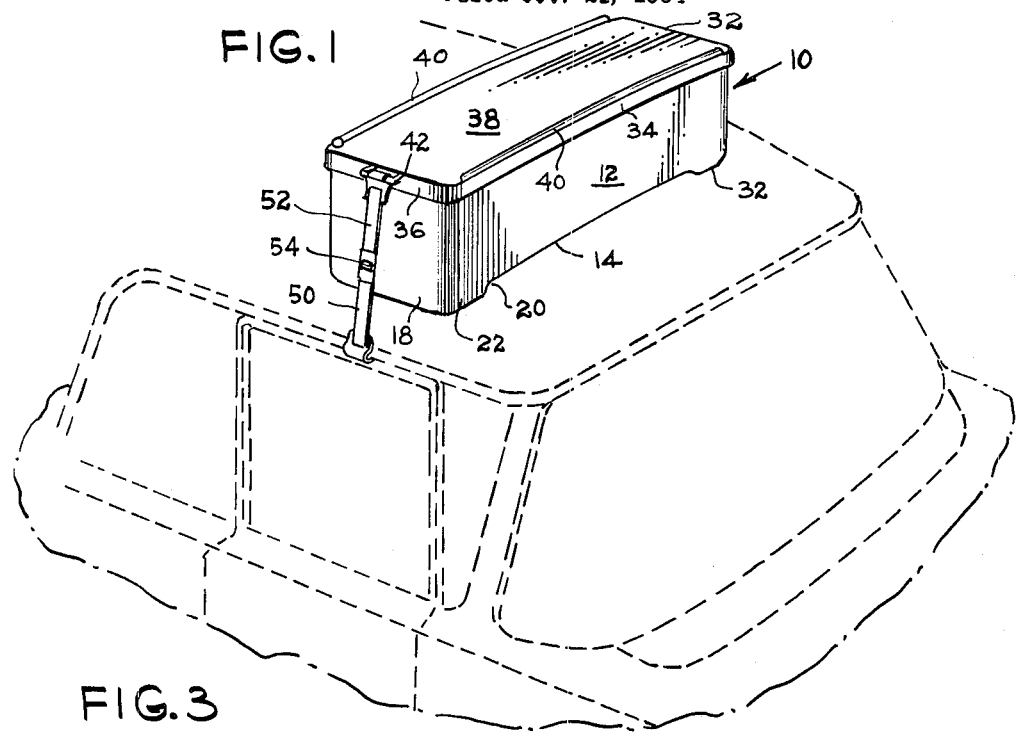
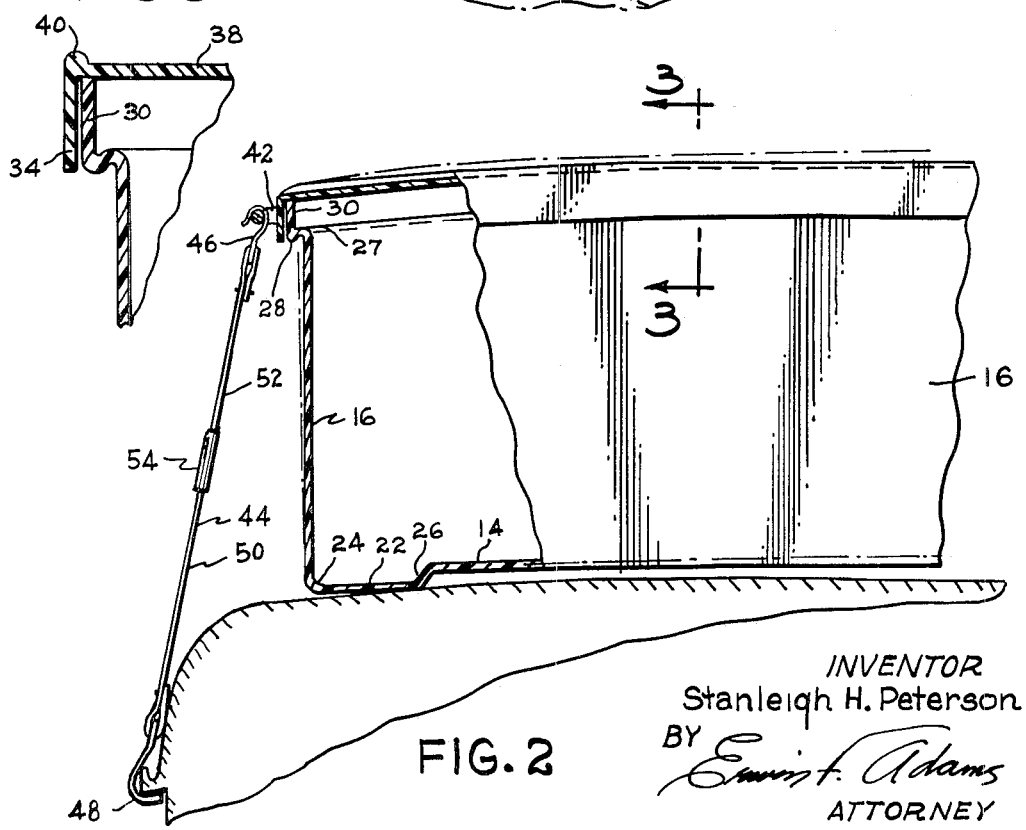
INVENTOR
Stanleigh H. Peterson
BY
ATTORNEY

3,228,575
CARTOP CARRIER
Stanleigh H. Peterson, 114 Park Lane, Lexington, N.C.
Filed Oct. 21, 1964, Ser. No. 405,386
5 Claims. (Cl. 224—42.1)

This invention relates to containers and, more particularly, to a container especially adapted for use on the top of a vehicle such as an automobile or the like.

Heretofore, containers have been devised for this purpose and have been commonly designated as "car top carriers." These carriers have assumed a variety of forms and configurations. For instance, one form of car top carrier comprises a substantially flat platform mounted on suction cups and secured to the rain gutters of the vehicle by means of adjustable straps. An enclosure of canvas, or the like, is secured to the platform and access is provided by means of an opening closable by means of a slide fastener. A disadvantage of a carrier of this type is that the straps must be adjusted each time the carrier is placed in position on the vehicle roof. Another disadvantage is that the fabric enclosure is not waterproof. A further disadvantage is that this type of carrier must be loaded while mounted on the vehicle roof. In another type of car top carrier, a body portion of rigid plastic, such as fiber glass, or the like, is mounted by means of suction cups on the vehicle roof and, because of the rigidity of the body portion, the straps also must be adjusted for each use.

A primary object of the invention is, therefore, to provide a car top carrier which is completely waterproof and which is characterized by the ability to remain in place on the vehicle top under all conditions of use.

A further object of the invention is to provide a container for use on the roof of a vehicle which is formed of rigid but flexible plastic material, such as polyethylene or the like, which is adapted to be stressed during installation so that the straps are maintained in taut condition throughout the period of use, and in which the straps need not be adjusted each time the container is used.

Another object of the invention is to provide a container of the stated type wherein a recess is formed at the bottom surface so that the bottom wall of the container bows upwardly upon stressing.

A further object of the invention is to provide a container of the mentioned character wherein an offset flange is formed at the upper marginal edges of each of the side walls to provide additional rigidity.

These and other objects of the invention will be apparent as the description proceeds with reference to the accompanying drawing in which:

FIGURE 1 is a view in perspective of a container made in accordance with the present invention shown in operative position on an automobile roof, illustrated in dot and dash lines;

FIGURE 2 is a fragmentary elevational sectional view of the container illustrated in operative relation to a vehicle; and FIGURE 3 is an enlarged fragmentary sectional view taken substantially on line 3—3 of FIGURE 2.

Referring now to the drawing, the container of the present invention is illustrated generally by reference numeral 10 and includes a body portion 12, of a semi-rigid flexible material such as polyethylene, or the like, having a bottom wall 14, side walls 16 (only one of which is shown).

According to an important feature of the present invention, the bottom wall 14 is formed with a longitudinally extending recess 20 which defines transversely extending feet 22 at each end of the body portion 12. As shown best in FIGURE 2, the feet 22 are defined by arcuate corners 24 and 26 for a purpose hereinafter described. The upper marginal edges of the side walls 16 and the end walls 18 are curved outwardly at 27 and curved upwardly at 28 to form an S curve terminating in a flange 30 parallel to the side and end walls and spaced outwardly therefrom. It will be appreciated that the S curve and the flange 30 provide additional rigidity for the upper marginal edges of the side and end walls.

Superposed on the body portion 12 is a lid portion 32, also of semi-rigid flexible material such as polyethylene or the like. The lid portion 32 is formed with depending flanges 34 at the sides thereof (only one of which is shown), and depending flanges 36 at the ends thereof (only one of which is shown). The flanges 34 and 36 are adapted to lie in limited space relation to the corresponding flange 30 of the body portion, as illustrated best in FIGURE 3. The lid portion 32 further includes a top panel 38 which is provided at each side thereof with an elongated integrally formed bead 40 to provide additional rigidity.

Secured to each of the flanges 36 is a handle 42. A pair of adjustable straps 44 (only one of which is shown) is provided to retain the container of the present invention in the position illustrated in FIGURE 1. Each of the straps 44 is provided at one end thereof with a hook 46 which is adapted to embrace one of the handles 42 and at the other end thereof with a hook 48 which is adapted to engage the lower surface of the rain gutter of a vehicle. As best seen in FIGURE 2, each strap 44 comprises two sections 50 and 52 adjustably secured each to the other by means of a buckle 54 preferably of the friction type.

When initially mounted on a particular vehicle, the straps 44 are adjusted so that the bottom wall 14 of the body portion 12 and the top panel 38 of the lid portion 32 bow upwardly, as illustrated in dot and dash lines in FIGURE 2. When this bowing occurs, a stress condition is set up in the entire container and the feet 22 are biased downwardly into contact with the surface of the vehicle roof. This stress condition assures tautness of the straps 44 at all times notwithstanding that the container is fully loaded. The bow in the bottom wall 14 additionally prevents the loaded container from contacting and thereby damaging the vehicle roof and also allowing air to pass underneath the container when the vehicle is in motion. A further advantage of this arrangement is that once the straps 44 are adjusted for a particular vehicle, they need not be again adjusted. For example, to release the container once installed, one of the straps 44 may be pulled downwardly to effect a slight additional bowing effect. Associated hook 48 may then be released from the adjacent rain gutter and the entire container may be easily removed. When it is desired to remount the container of the present invention on the same vehicle, one of the straps 44 may be placed in the position illustrated in FIGURE 2 and the other strap 44 may be pulled downwardly to effect slightly more flexing than required. At this time, the hook 48 may be placed in engagement with the adjacent rain gutter.

The container of the present invention exhibits important advantages over car top carriers heretofore known. The most important of these advantages is that the construction and arrangement of the bottom wall of the body portion is such as to permit the requisite flexing to set up a stress condition which tends to keep the straps taut even at high speed operation of the vehicle. The provision of the flanges 30 prevents inward distortion of the upper marginal edges of the side and end walls of the body portion, while the beads 40 tend to rigidify the depending flanges 34 of the lid portion 32.

Applicant does not intend to be limited by the above description, but rather intends that the scope of his invention be defined by the appended claims.

I claim:
1. A container adapted to be positioned atop a vehicle comprising a flexible body portion comprising spaced side walls, spaced end walls, a bottom wall, said bottom wall having an upwardly extending recess, a lid portion, said lid portion having a top panel and depending side and end walls dimensioned snugly to receive the upper marginal edges of the walls of said body portion, a handle secured to the outer surface of each end wall of said lid portion, and a strap secured to each of said handles and having at the free end thereof a hook adapted to engage the rain gutter at the side of the vehicle roof, said body portion and said lid portion being adapted to flex upwardly as the straps are attached to effect a stress condition in the container during installation and during use so that the straps are maintained in a taut condition throughout the period of use, and in which the straps need not be adjusted each time the container is used.

2. A container in accordance with claim 1 wherein said recess is formed by a plurality of downwardly extending integrally formed feet, one at each end thereof.

3. A container in accordance with claim 1 wherein said straps are initially adjustable to accommodate the dimensions of a particular vehicle.

4. A container in accordance with claim 1 wherein the upper marginal edges of each of the walls of said body portion are formed in an S curve and terminate in a flange extending in parallel to each wall and spaced outwardly therefrom.

5. A container in accordance with claim 1 wherein said lid portion is provided with a pair of reinforcing beads adjacent each side edge thereof.

References Cited by the Examiner

UNITED STATES PATENTS 1,456,167  5/1923  Wiswell et al. _____ 224—42.4

FOREIGN PATENTS 685,786  4/1930  France.
1,089,543  10/1954  France.

GERALD M. FORLENZA, *Primary Examiner.*

JAMES E. OLDS, *Assistant Examiner.*